(12) United States Patent
Lyne et al.

(10) Patent No.: US 11,045,843 B2
(45) Date of Patent: Jun. 29, 2021

(54) FIBER CATCHER AND METHOD OF REMOVING FIBERS

(71) Applicant: Rozalia Project Incorporated, Granville, VT (US)

(72) Inventors: James Russell Lyne, Granville, VT (US); Rachael Zoe Miller, Granville, VT (US); Brooke Oh Winslow, Granville, VT (US)

(73) Assignee: Rozalia Project Incorporated, Burlington, VT (US)

(*) Notice: Subject to any disclaimer, the term of this patent is extended or adjusted under 35 U.S.C. 154(b) by 79 days.

(21) Appl. No.: 16/089,972

(22) PCT Filed: Mar. 31, 2017

(86) PCT No.: PCT/US2017/025273
§ 371 (c)(1),
(2) Date: Sep. 28, 2018

(87) PCT Pub. No.: WO2017/173215
PCT Pub. Date: Oct. 5, 2017

(65) Prior Publication Data
US 2019/0126326 A1  May 2, 2019

Related U.S. Application Data

(63) Continuation of application No. 29/597,360, filed on Mar. 16, 2017, now Pat. No. Des. 833,609.
(Continued)

(51) Int. Cl.
*B08B 1/00* (2006.01)
*D06F 58/22* (2006.01)
(Continued)

(52) U.S. Cl.
CPC .............. *B08B 1/001* (2013.01); *C02F 1/001* (2013.01); *D06F 39/024* (2013.01);
(Continued)

(58) Field of Classification Search
CPC ....... B08B 1/001; D06F 58/203; D06F 58/22; D06F 39/024; D06F 39/10; C02F 1/001;
(Continued)

(56) References Cited

U.S. PATENT DOCUMENTS

2008/0216221 A1* 9/2008 Markaj ................. B01D 35/10
4/289

FOREIGN PATENT DOCUMENTS

CN         202466728 U    10/2012

OTHER PUBLICATIONS

Copenheaver, "International Search Report and Written Opinion", related to International Application No. PCT/US2017/025273, dated Jun. 21, 2017.
(Continued)

*Primary Examiner* — Madeline Gonzalez
(74) *Attorney, Agent, or Firm* — Shawn Gordon, Esq.; Dunkiel Saunders Elliott, Raubvogel & Hand, PLLC

(57) ABSTRACT

A fiber catcher is provided for removing fibers, microfibers, hair and similar items from fluids, such as may be found in effluent pipes, streams, washing machines and clothes dryers that includes a plurality of arms with a plurality of teeth for collecting fibers that are suspended in fluids.

1 Claim, 12 Drawing Sheets

Related U.S. Application Data

(60) Provisional application No. 62/315,836, filed on Mar. 31, 2016.

(51) Int. Cl.
*C02F 1/00* (2006.01)
*D06F 39/02* (2006.01)
*D06F 58/20* (2006.01)
*C02F 103/00* (2006.01)
*D06F 39/10* (2006.01)

(52) U.S. Cl.
CPC ...... *D06F 58/203* (2013.01); *C02F 2103/002* (2013.01); *D06F 39/10* (2013.01); *D06F 58/22* (2013.01)

(58) Field of Classification Search
CPC ... C02F 2103/002; B04B 11/06; B01D 29/05; B01D 29/31; B01D 29/0027; B01D 35/023; B01D 35/05; B01D 33/00

USPC ...... 210/171, 172.6, 242.1, 354, 380.3, 495, 210/380.2

See application file for complete search history.

(56) References Cited

OTHER PUBLICATIONS

"First Office Action", related to China App No. 201780033213.6, dated Feb. 6, 2020.

Schiffer, "Response to the Communication pursuant to Rules 161 (2) and 162 EPC", related to European Application No. 17776742.3, dated May 21, 2019.

Weidner, "Supplemental European Search Report", regarding European Application No. 17776742.3, dated Oct. 10, 2019.

\* cited by examiner

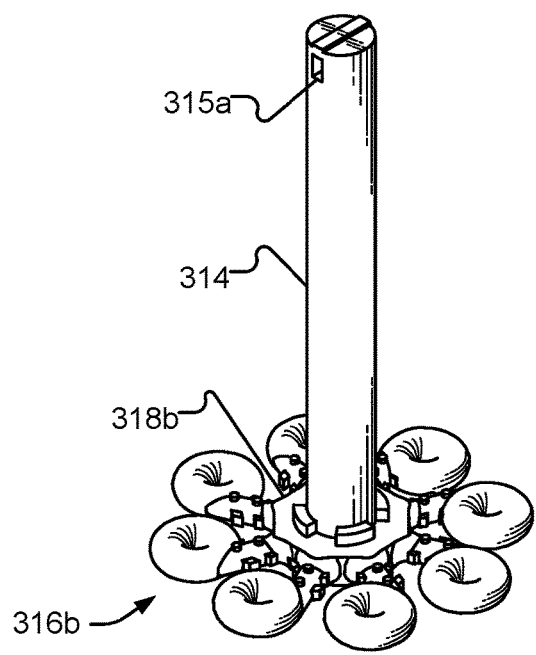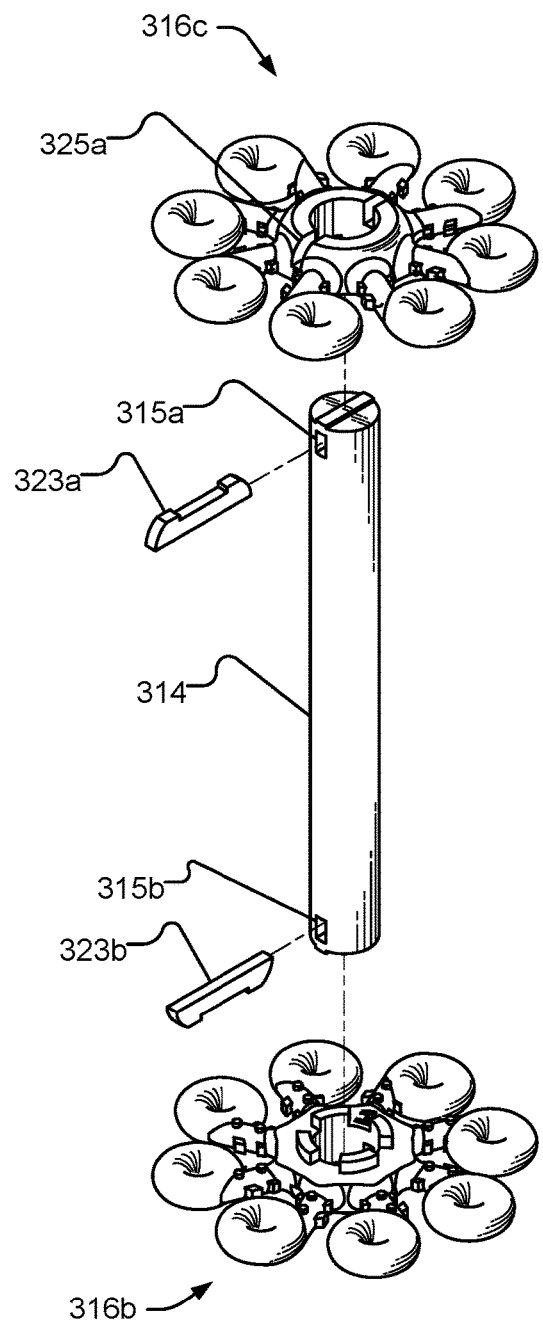
Fig.12
Fig.13

FIBER CATCHER AND METHOD OF REMOVING FIBERS

RELATED APPLICATIONS

This application is a national stage application of PCT Application No. PCT/US17/025273, filed Mar. 31, 2017 and titled "Microfiber Catcher and Method of Removing Microfibers", which claims priority to U.S. Provisional Application No. 62/315,836 filed on Mar. 31, 2016, and titled "Microfiber Catcher and Method of Removing Microfibers," and U.S. Design patent application No. 29/597,360 filed on Mar. 16, 2017, titled "Microfiber Catcher Ball," each of which is incorporated herein in their entireties.

FIELD OF THE INVENTION

The present invention generally relates to mechanical removal of contaminants from water sources. In particular, the present invention is directed to a fiber catcher and method of removing fibers from water.

BACKGROUND

The process of washing and drying many "high performance" clothes (e.g., clothes at least partially made up of synthetic materials such as acrylic and polyester) leaves behind thousands of tiny plastic threads, threads that eventually make their way through almost all septic and water treatment facilities and into streams, lakes, rivers, and oceans. According to a recent study, nearly 2,000 synthetic fibers can shake loose from a single piece of clothing during a wash cycle. And sand samples from several beaches on six continents each contained microplastics (particles about the size of a piece of long grain rice or smaller). Many of these microfibers are buoyant making them available to fish and sea creatures swimming at the surface and within the water column. In addition, since many plastics are heavier than water, particles from these plastics may eventually end up on a waterway's floor, where they pollute bottom sediments and can be absorbed or taken up by filter feeders like clams, mussels, and small fish like anchovies, sardines, etc., which are in turn eaten by larger fish. In this way, microfibers from clothing that keeps people warm and dry may be slowly added into the food chain. This bioaccumulation of pollutants can have negative consequences for wildlife and humans.

Although plastic threads are a known threat, microfibers also emanate from natural fibers including, but not limited to, cottons and wool. While the full impact of these additional fibers is not known, removal of all fibers before they enter waterways would likely be beneficial to the ecosystem, water clarity, and human health.

In addition, slightly larger fibers and other elongated strands that are often present in laundry, such as hair, fur, or threads from clothing can accumulate in drains or vents after washing and drying cycles. Further, these more visible fibers and strands can cling to articles of clothing through a washing (and drying) cycle, resulting in laundered clothing ending up with visible strands or clumps of fibers or strands.

What is needed, therefore, is a system that removes microfibers, fibers, filaments, hair, fur and/or other thread-like material (referred to herein collectively as "fibers") from water.

SUMMARY OF THE DISCLOSURE

In a first aspect, a device is provided for removing fibers from fluids and configured to withstand conditions in residential laundry machines and clothes dryers, including a center portion, a plurality of arms having an inner end connected to the center portion and an outer end extending away from the center portion, wherein each of the plurality of arms has a plurality of fingers extending therefrom and wherein the plurality of fingers are sized and configured to collect fibers from fluid flowing through the device, and a plurality of protuberances, each attached to and extending away from the outer end of each of the plurality arms, wherein the plurality of protuberances are configured to allow fluid to pass to the arms while discouraging bulk items from passing in toward the plurality of arms.

In another aspect, a device for removing fibers from fluids is provided that includes a plurality of arms each having an inward facing end and an outward facing end, each of the plurality of arms being structurally connected via each respective inward facing end, a plurality of teeth extending from each of the plurality of arms, each of the plurality of teeth configured to collect fibers, and a plurality of protuberances each attached to the outward facing end of each of the plurality of arms and configured to allow fluids to pass inwardly while blocking bulkier items.

In yet another aspect, a device for removing fibers from an aqueous solution is disclosed with a central rod with a top end, a middle portion, and a bottom end, a plurality of discs each including a central opening sized and shaped to fit on the central rod and having a plurality of arms, wherein each of the plurality of arms extends outwardly from the central opening to an outer end on a plane that is substantially orthogonal with respect to the central rod, wherein the plurality of arms on a given disc of the plurality of discs has a length that is a function of the position of the given disc on the central rod such that the plurality of arms on ones of the plurality of discs coupled to the central rod proximate the top end and proximate the bottom end have a length that is shorter than the plurality of arms on ones of the plurality of discs coupled to the central rod on the middle portion, and wherein each of the plurality of arms has a plurality of teeth extending therefrom and a protuberance attached at the outer end.

BRIEF DESCRIPTION OF THE DRAWINGS

As used herein, directional references such as vertical, top, bottom and side refer to the orientation shown in the accompanying drawings for convenience, but it is understood that the fiber catchers of the present invention generally will not have a required or preferential spatial orientation. For the purpose of illustrating the invention, the drawings show aspects of one or more embodiments of the invention. However, it should be understood that the present invention is not limited to the precise arrangements and instrumentalities shown in the drawings, wherein:

FIG. 12 depicts a partially assembled view of part of the embodiment of FIG. 5; and FIG. 13 depicts a disassembled view of part of the embodiment of FIG. 5.

DESCRIPTION OF THE DISCLOSURE

A fiber catcher as disclosed herein is an apparatus that can effectively and efficiently remove fibers that are present in an aqueous or gaseous environment, such as, but not limited to, a washing machine, a clothes dryer, a graywater pipe, a waste treatment effluent, a waterway (e.g., canal, river, stream, etc.), or other body of water. The fiber catcher can have multidirectional movement and can be at least partially buoyant in typical aqueous solutions. A fiber catcher according to the present disclosure can be deployed directly into a residential or commercial washing machine or clothes dryer so as to collect fibers, thereby preventing those fibers from sticking to clothing or entering a downstream water source or the environment.

Figure 1:
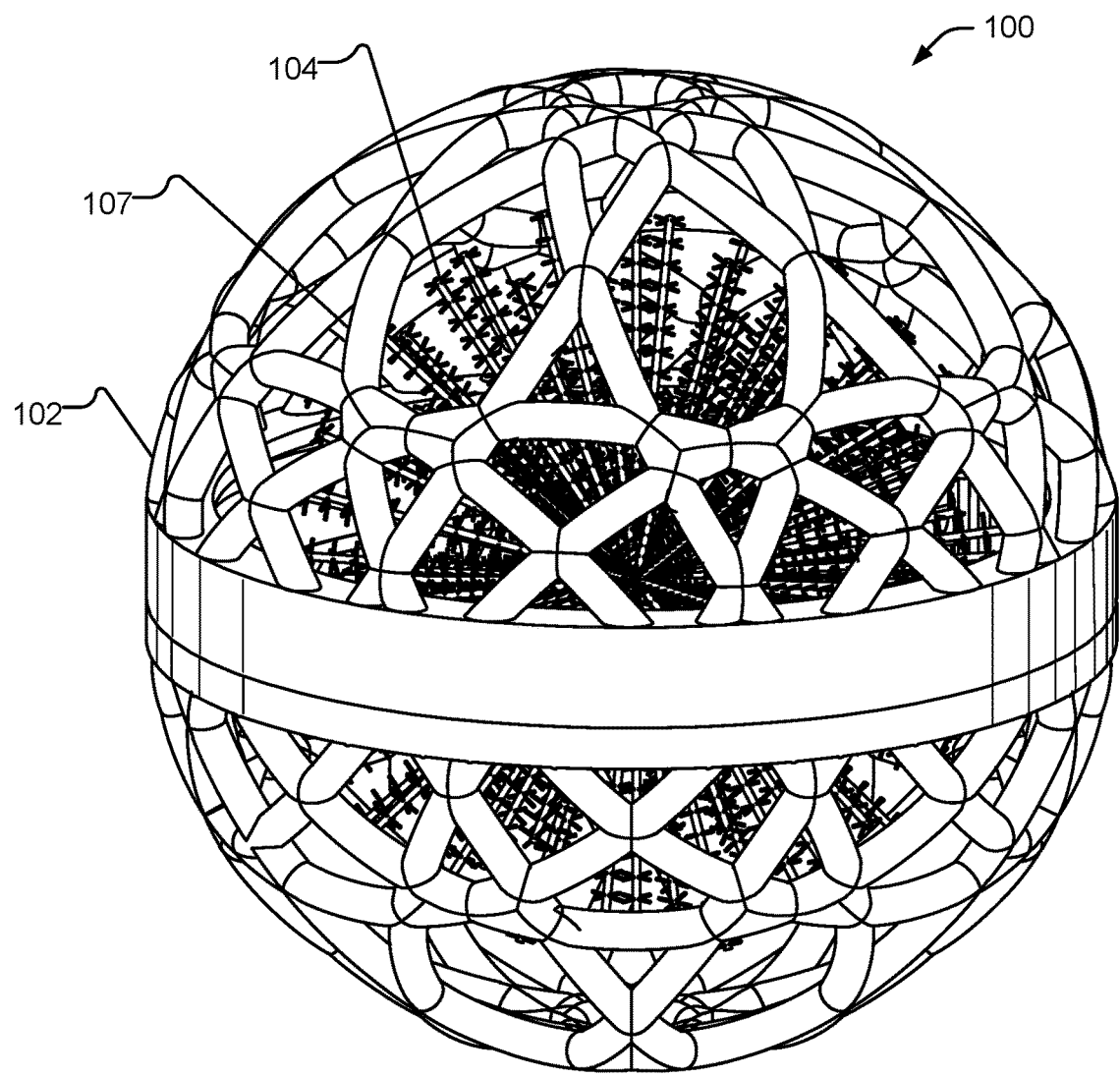
FIG. 1 depicts an embodiment of a fiber catcher of the present invention.

In an exemplary embodiment and as shown in FIG. 1, a fiber catcher 100 has an outer portion 102 and an inner portion 104. In a preferred embodiment, as shown, both inner portion 104 and outer portion 102 are generally spherical. Outer portion 102 is sized and configured to allow for sufficient water flow through fiber catcher 100. For example, outer portion 102 may be a sphere approximately 5 to 12 or more centimeters in diameter (which may be a convenient size for typical laundry machines, although it will be understood that other shapes and sizes are possible for different applications) and include several openings surrounded by supports, e.g., support 107. This cage-like structure of outer portion 102 is configured so as to not require any particular direction of water flow. Thus, outer portion 102 allows for omnidirectional capture of fibers (by inner portion 104, which is described in more detail below) irrespective of the direction of water flow or orientation of fiber catcher 100. In an exemplary embodiment, the permeability of outer portion 102 can be such that items of a certain size or greater (i.e., items that tend to be unable to pass through the opening under normal conditions), such as socks, fish, etc. (also referred to herein as bulk or bulkier items), are kept from accessing inner portion 104.

Figure 2:
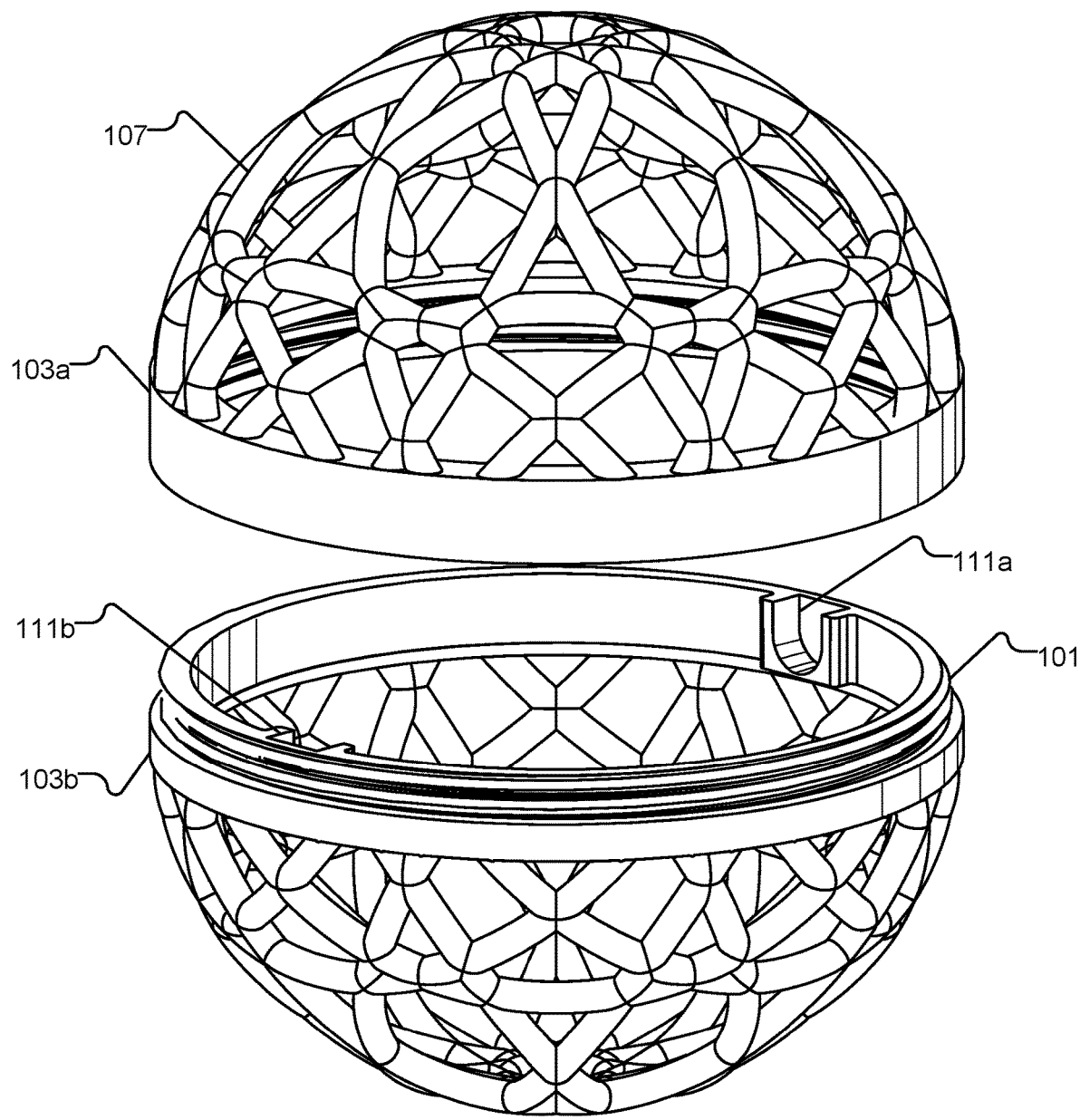
FIG. 2 depicts parts of a partially assembled embodiment of FIG. 1.

Outer portion 102 may be constructed from two hemispheres (e.g., 103a and 103b as shown in FIG. 2) that can be releasably attached to each other to allow access to inner portion 104 as necessary, such as for cleaning. In a preferred embodiment, hemispheres 103a and 103b may be secured together via threads 101 as shown in FIG. 2. Outer portion 102 may be made of any material suitable for an intended use of fiber catcher 100, such as in residential and/or commercial washers and dryers, including plastics and rubbers, and preferably thermoplastic elastomers (TPE), such as, but not limited to, TPE-O (thermoplastic elastomeric material based on olefins, mainly a polypropylene (PP)/ethylene propylene diene monomer (EPDM)), TPE-U (thermoplastic elastomeric materials based on urethane), and TPE-Z (crosslinked thermoplastic elastomeric material based on polyolefin PP/EPDM mixture), as well as polypropylene, silicones, and metals. In applications in which more resiliency is desirable, thermoplastic elastomers or silicones may be selected. In applications in which more rigidity or durability is desirable, polypropylene or metals may be selected. As used throughout, commercial laundry washing machines may have a range of water temperatures from about 5 degrees Celsius to about 66 degrees Celsius and commercial dryers may have a range of air temperatures from about 15 degrees Celsius to about 100 degrees Celsius. The ranges for commercial washing and drying machines exceed the operating ranges of residential machines in most, if not all, instances.

Figure 3:
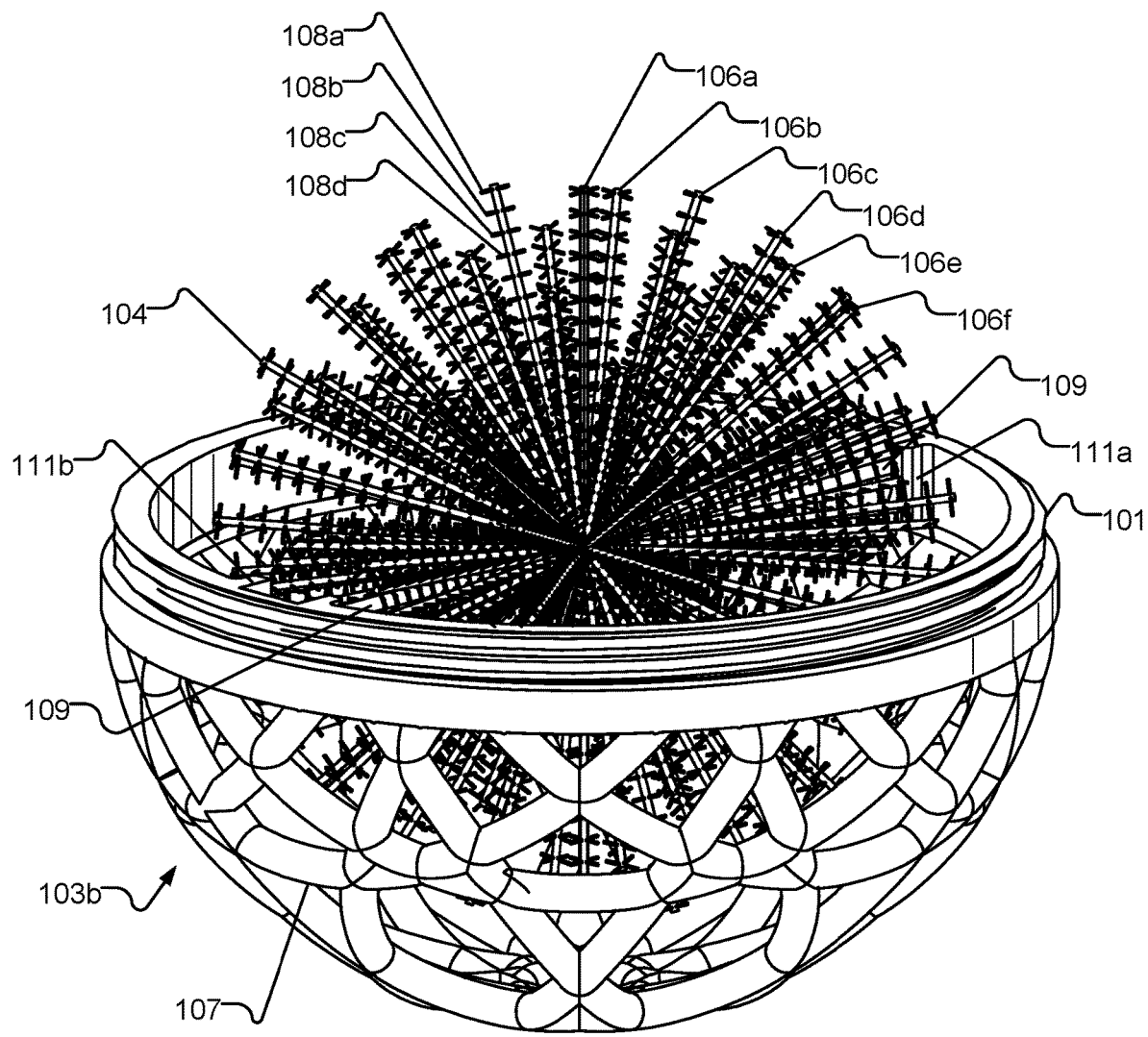
FIG. 3 depicts parts of a partially assembled embodiment of FIG. 1.

In certain embodiments, outer portion 102 and inner portion 104 are configured such that inner portion 104 and outer portion 102 can rotate with respect to each other in the presence of flowing or moving water so as to reduce horizontal displacement of fiber catcher 100. This may be accomplished by, for example, having inner portion 104 be connected to outer portion 102 by the ends of an axis of inner portion 104 such that inner portion 104 and outer portion 102 can rotate independently with respect to that axis. For example, as shown in a partially assembled embodiment in FIG. 3, inner portion 104 may include a substantially tubular piece 109 that has ends designed to mate with outer portion 102 on both ends via a suitable mechanism that secures tubular piece 109 while allowing tubular piece 109 to rotate in either direction, such as appropriately sized cutouts 111 (e.g., 111a and 111b, which can be seen more clearly in FIG. 2) in outer portion 102, as shown in FIG. 3. In this way, tubular piece 109 serves as an axis of rotation of inner portion 104 to rotate within outer portion 102 while outer portion 102 can rotate around that axis largely unencumbered as well.

Turning again to FIG. 3, inner portion 104 is configured to collect fibers, and may include arms 106 (e.g., 106a-106f) with a multitude of fingers or teeth 108 (e.g., 108a-108d). In a preferred embodiment, inner portion 104 includes a sufficient number of arms 106 projecting from a central portion and sized to form an approximate sphere shape that fits within outer portion 102. Teeth 108 in a preferred embodiment project out from arms 106 at an approximately 90 degree angle or any suitable angle (or assortment or pattern of angles) that encourages the collection of fibers on teeth 108 as water flows past the arms 106 of inner portion 104.

In general, inner portion 104 is configured in any way to enable the capture of fibers, such as to include a rough and relatively large capture surface area relative to the volume of inner portion 104 while still maintaining an overall permeable structure. In operation, as water entrained with fibers that are suspended in water or on the water's surface pass through outer sphere 102 and into inner sphere 104, fibers are captured by inner portion 104 and the water flows out of inner sphere 104 and then out of outer sphere 102 freer of fibers.

Other possible configurations for inner portion 104 include nature inspired designs, such as, but not limited to, a burr design, a coral design, a sea anemone design, and combinations of the same. Inner portion 104 may be made of any material suitable for an intended use of fiber catcher 100, such as in residential and/or commercial washers and dryers, including plastics and rubbers, and preferably thermoplastic elastomers, such as, but not limited to, TPE-O, TPE-U, and TPE-V, as well as polypropylene, silicones, and metals. In applications in which more resiliency is desirable, thermoplastic elastomers may be selected. In applications in which more rigidity or durability is desirable, polypropylene or metals may be selected.

When assembled, as shown in FIG. 1, and placed in water (or other fluid), inner portion 104 and outer portion 102 collect fibers, thereby removing them from the water, whether that water is in a washing machine, wastewater outflow or a public waterway. Similarly, fiber catcher 100 can also remove fibers from air when air passes through and as such may be used in clothes dryers, for example.

In an exemplary embodiment, fiber catcher 100 is buoyant. Buoyancy serves to place or allow fiber catcher 100 to make its way to the surface of the water source, e.g., to the top of the wash, even if it starts at the bottom (of, for example, a top load washer machine). Preferably, fiber catcher 100 is not so buoyant so that fiber catcher 100 sits too high out of the water; rather, in a preferred embodiment fiber catcher 100 displaces about half its weight of water. Turning again to the exemplary use in a washing machine, fiber catcher 100 preferably is buoyant enough to stay on the top of the wash water, about half in and half out of the water. In this position, fiber catcher 100 is configured to pick up those fibers that tend to rest at the surface of the wash water thanks to the presence of soap. (Soap has a high fat content and is generally made with a saponification process, relying on surfactants to actively remove dirt and hair from clothes.) A washing machine's action that causes the agitation of the wash water, coupled with surfactants in laundry soap, removes the dirt and hair from our clothes. Because soap has fats, it floats and concentrates the largest amounts of fibers at the top of the wash.

In another exemplary embodiment, fiber catcher 100 is configured to rest below the water surface or near an exit water flow. For example, some washing machines do not include a central agitator and do not use an amount of water that would allow fiber catcher 100 to move around the surface. In these situations, fiber catcher 100 can have a density so as to float below the water's surface, be weighted or designed to have a flat-bottom (e.g., only one hemisphere of the outer portion of fiber catcher 100 is employed), so that fiber catcher 100 rests at the bottom of the machine and moves with the action of the drum.

For this exemplary embodiment, when in use in a washing machine fiber catcher 100 starts to move around the wash once the washing machine has filled with water. A typical washing machine has a drum that moves in multiple directions during the agitation cycle and makes relatively frequent stops/reverses. Notably, when the drum stops, the inertia of fiber catcher 100 makes it roll to a new area of the wash, thereby collecting more fibers in that area.

While fiber catcher 100 is moving around the washing machine, inner portion 104 rotates in a way that can generally be considered eccentric. By eccentric, what is meant is not a rhythmic movement; for example, sometimes the rotation is quick and other times the rotation is languid. In an exemplary embodiment, inner portion 104 is generally a sphere that is split into hemispheres, where one of the hemispheres is heavier than the other, which can cause additional motion of inner portion 104. In an exemplary embodiment, the weight difference between the hemispheres of inner portion 104 is due to having one hemisphere's catch arms longer than the other. In another exemplary embodiment, the weight difference between the hemispheres of inner portion 104 is due to a reduction in the number of fingers on the catch arms of one of the hemispheres when compared to the other. Based on this exemplary configuration, outer portion 102 and inner portion 104 operate on different planes of movement, which can allow more water to go through fiber catcher 100 and facilitate the collection of more fibers.

The various motions of fiber catcher 100 allow fiber catcher 100 to move through and/or interact with more of the water in the washing machine more often. Some of this movement (i.e., rotational and translational) is driven using energy provided by hydrodynamics, gravity, and the agitator of the washing machine.

Figure 4:
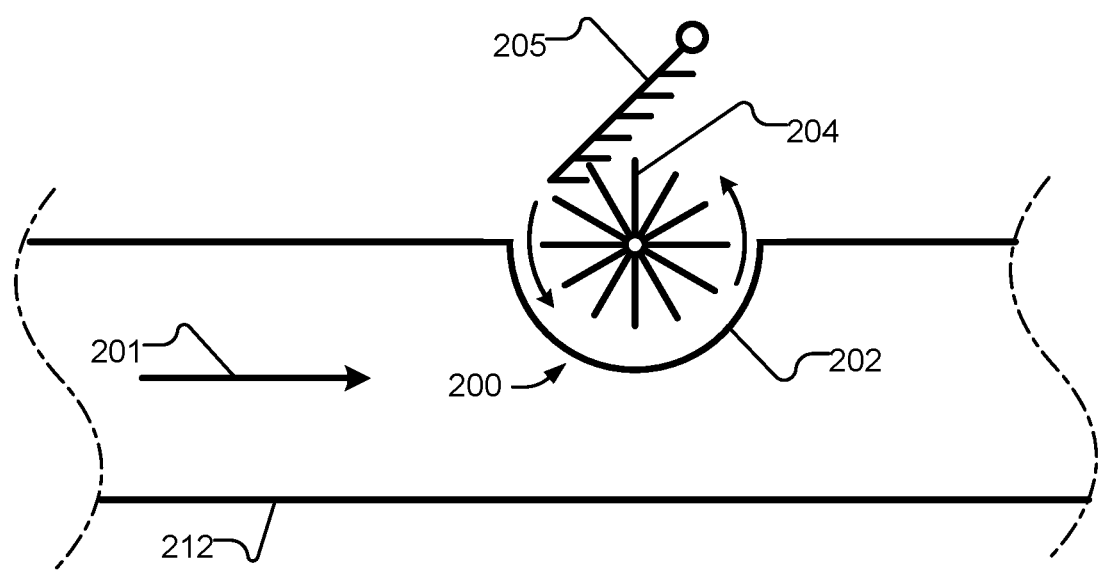
FIG. 4 depicts another embodiment of a fiber catcher of the present invention.

A fiber catcher as described herein can be used in other environments besides the washing machine examples discussed above. For example, wastewater treatment plants do not have the ability to effectively filter out microfibers and thus once household effluent is treated, the fibers are being flushed out into waterways, lakes, rivers, and oceans. As the outflow of a wastewater treatment plant is generally linear (as opposed to agitated as in a washing machine), there is an opportunity to position, as shown schematically in FIG. 4, outer portion 202 of fiber catcher in the water flow within effluent pipe 212 to ensure better contact with fiber catcher 200, to provide for water ingress, and to allow for cleaning of fiber catcher 200 with cleaning device 205 as inner portion 204 rotates due to the flow of the water. In an exemplary embodiment, at any one moment about half of fiber catcher 200 extends inside effluent pipe 212 and the other half outside effluent pipe 212 (where the pipe is sealed at this junction to prevent water egress). In this embodiment, outside of pipe 212 there can be a comb-like self-cleaning device 205 cleaning the other half of the sphere as inner portion 204 rotates under the influence of a direction of water flow 201.

In another exemplary embodiment, fiber catchers could be deployed by attaching them to buoy lines in harbors and rivers or strategically placed on stationary moorings.

Figure 5:
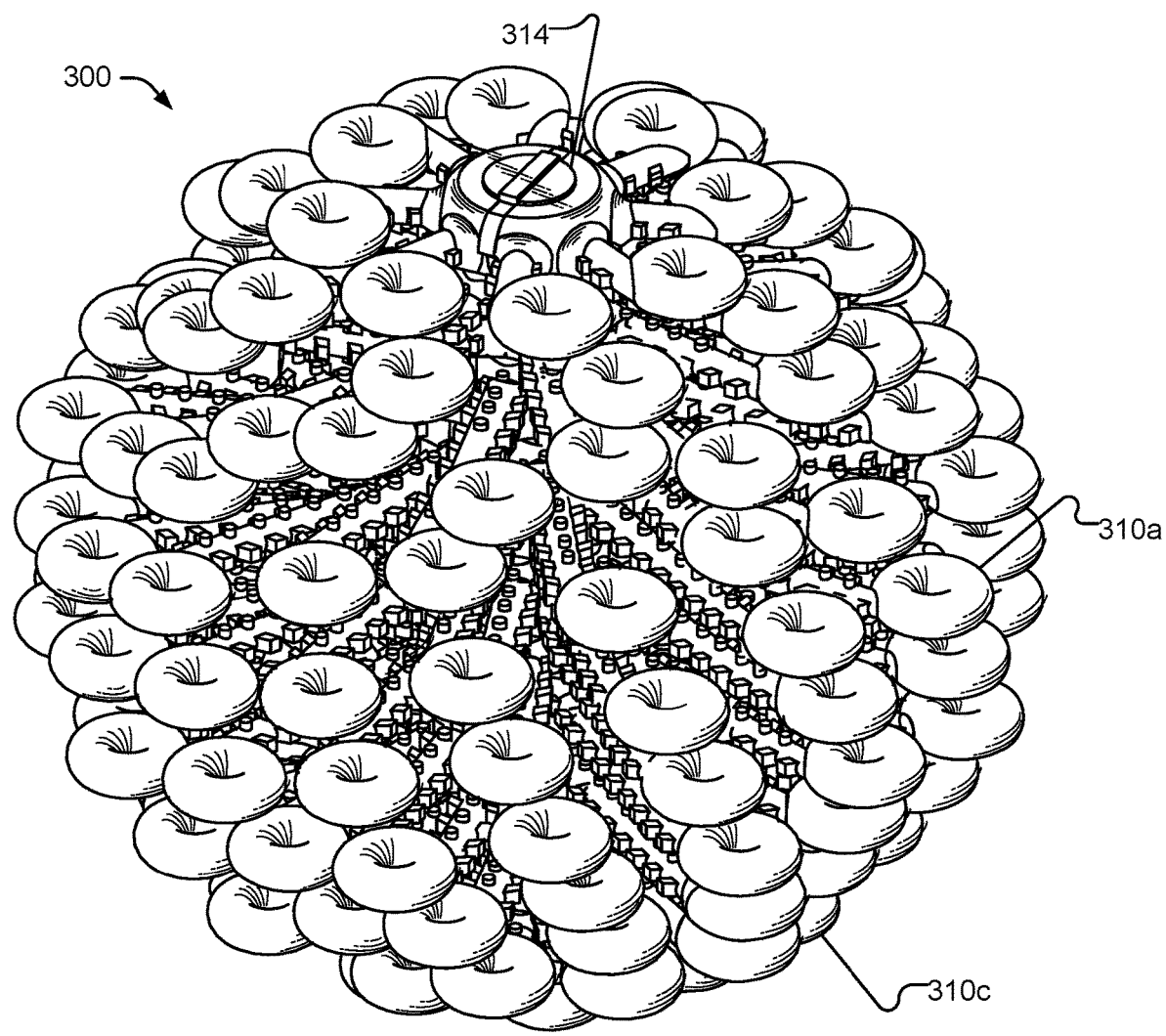
FIG. 5 depicts a perspective view of another embodiment of a fiber catcher of the present invention.
Figure 6:
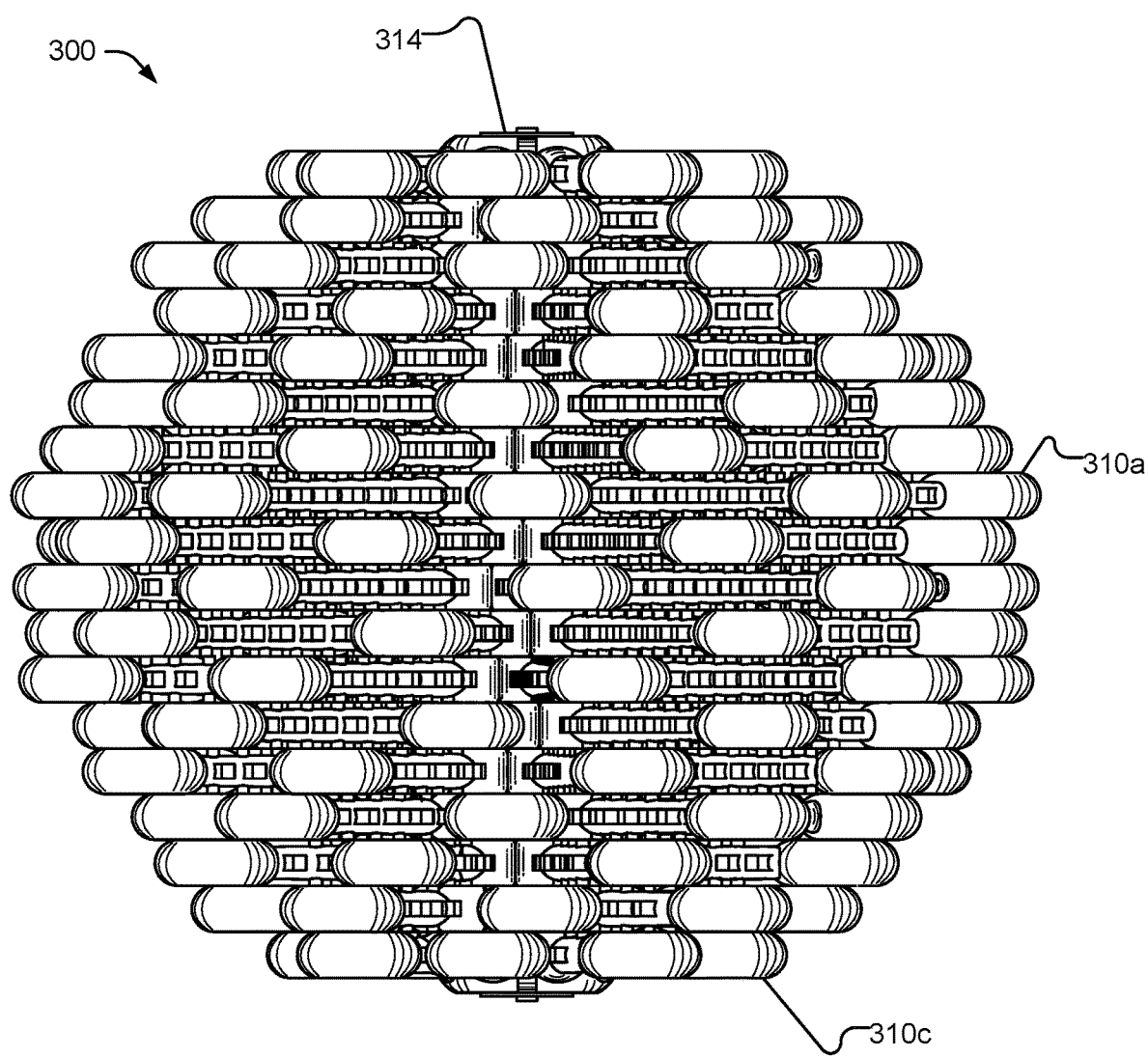
FIG. 6 is a side view of the embodiment of FIG. 5.
Figure 7:
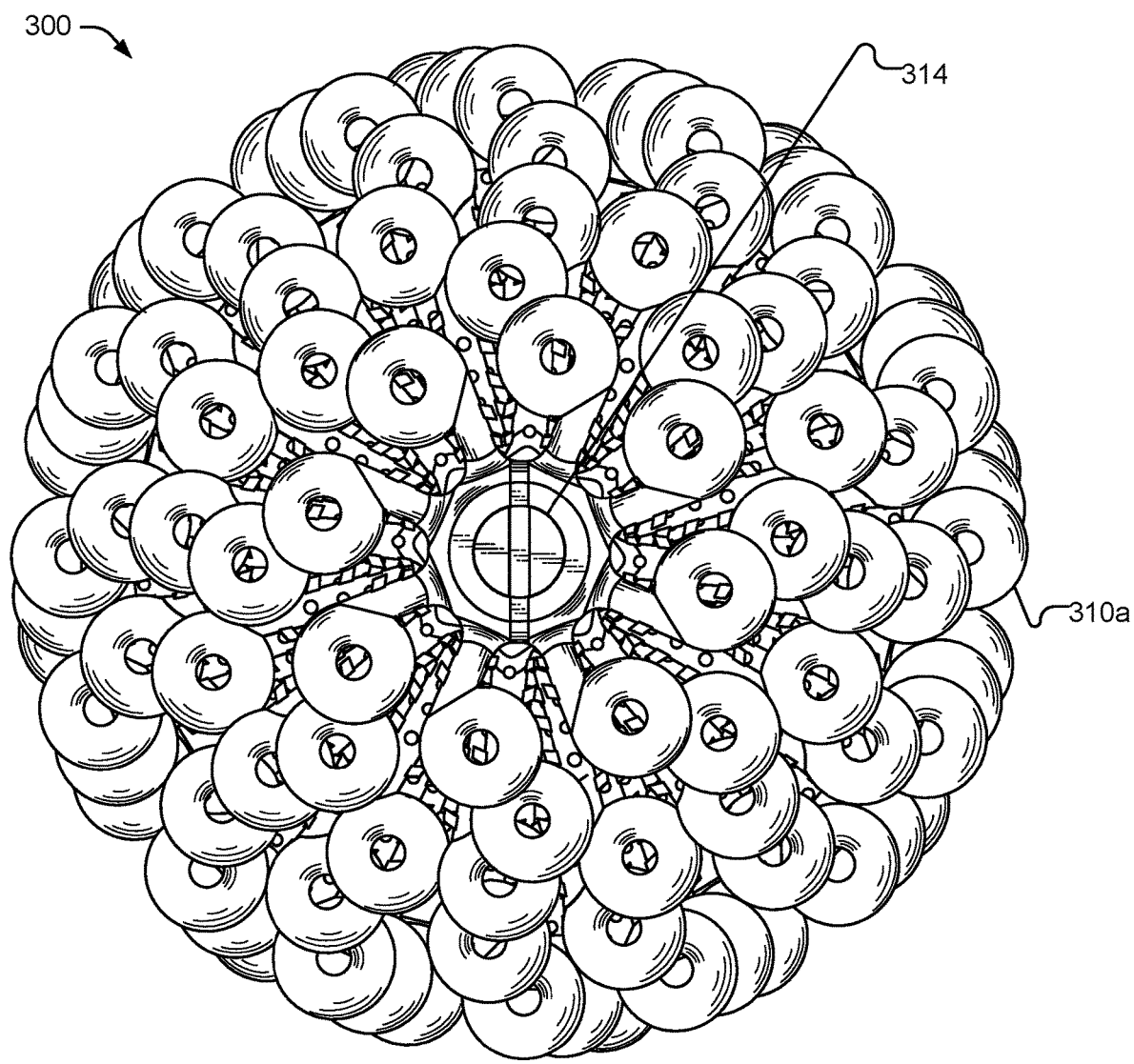
FIG. 7 is a top view of the embodiment of FIG. 5.
Figure 8:
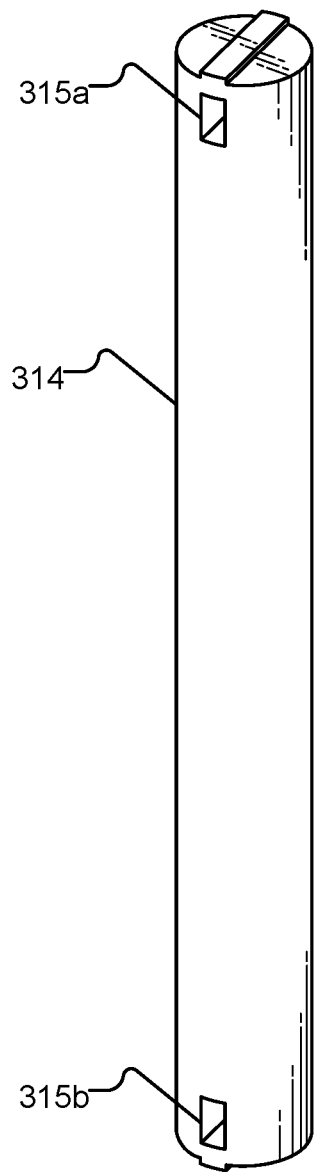
FIG. 8 is a perspective view of a part of the embodiment of FIG. 5.
Figure 9:
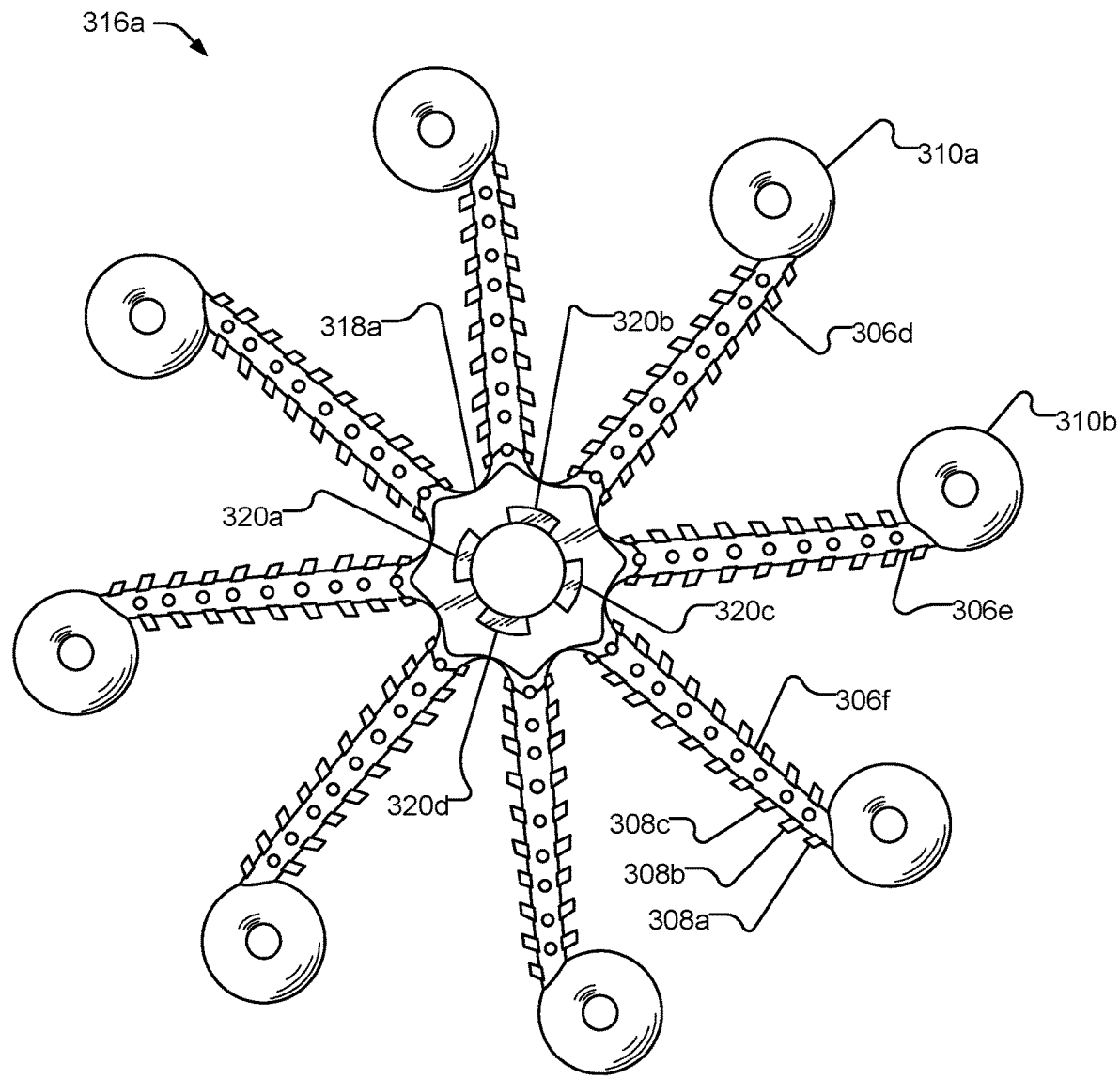
FIG. 9 is a top view of a part of the embodiment of FIG. 5.
Figure 10:
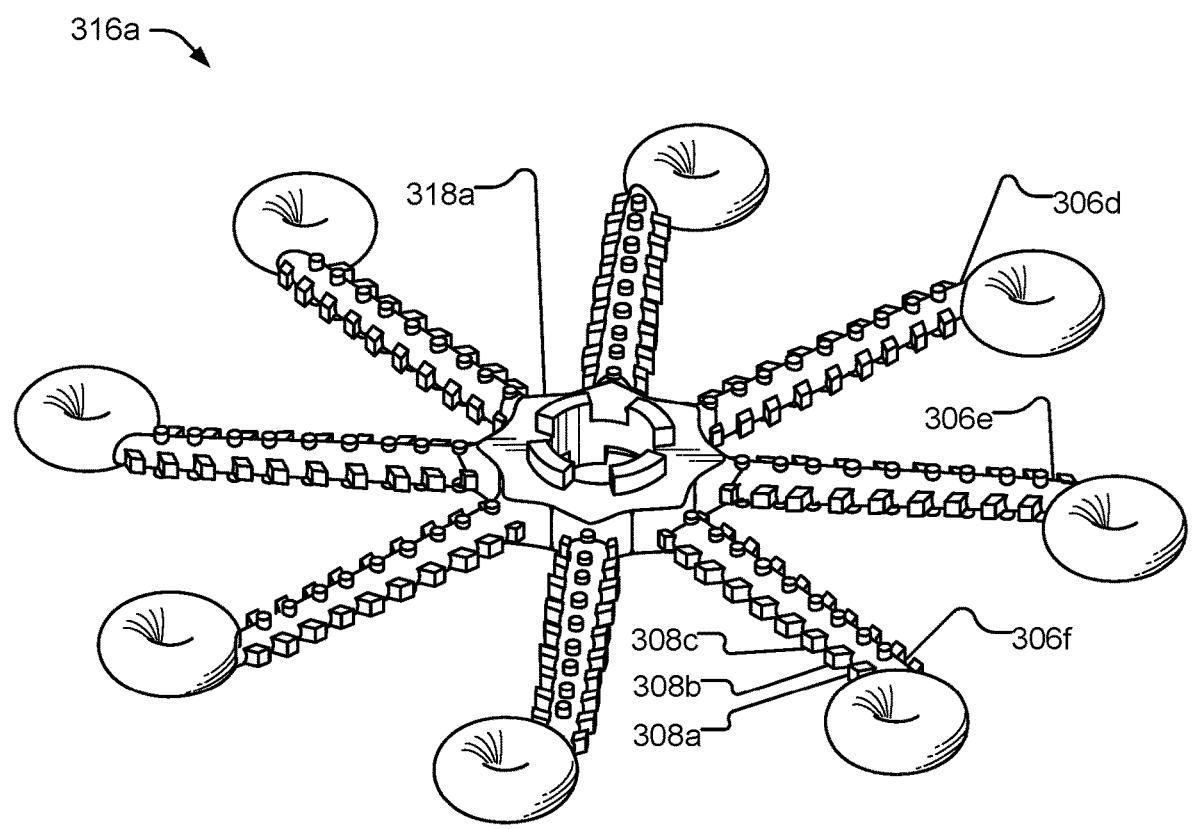
FIG. 10 is a perspective view of a part of the embodiment of FIG. 5.

Turning now to FIGS. 5-13, another exemplary embodiment is disclosed in which a fiber catcher 300 includes arms 306 (e.g., 306a-306f), fingers or teeth 308, (e.g., 308a-308f) and protuberances 310 (e.g., 310a-310c) (these aspects can be seen more clearly in FIG. 9, which is a view of a disassembled part of fiber catcher 300). While fiber catchers of the present invention may be constructed in any suitable manner, in a preferred embodiment, arms 306 extend from a central axis, such as a rod or spindle 314, and are sized and distributed so that fiber catcher 300 forms a generally spherical shape, although it will be understood that other shapes are possible. Preferably in this embodiment, arms 306 may be arranged generally initially in parallel with each other in a direction orthogonal to the central axis, that is, if spindle 314 is oriented in a vertical direction, arms 306 will extend out from spindle 314 horizontally in parallel with each other (as can be seen most clearly in FIG. 6). However, it will be noted that arms 306 in a preferred embodiment have flexibility and elasticity and thus in use can deviate from any default orientation during use, for cleaning, or if forced. In addition, arms 306 may be staggered, such as in a spiral configuration, so that arms 306 that are vertically adjacent are not aligned right above or below one another (as can be seen for example in FIGS. 6-7). As can be seen in FIGS. 5-7, protuberances 310 occupy over 50% of the possible outer surface area that would encompass the arms of fiber catcher 300.

Such preferred configurations, as well as other configurations, may be accomplished for example by assembling arms 306 in groups connected to discs 316 (e.g., 316a-316b in FIGS. 9-11b) and stacking said discs 316 on central spindle 314. FIG. 8 depicts spindle 314, which may include pin receptacles 315 (e.g., 315a and 315b) near one end or both ends for securing assembled discs 316 in place in a manner described below.

For each disc 316, such as disc 316a in FIG. 9, arms 306 (e.g., 306d-306f in disc 316a in FIG. 9) extend out from a ring 318 (e.g., 318a in FIG. 9) with an opening that is designed to fit on spindle 314. For example, in FIG. 12, disc 316b is shown on spindle 314. In this way, a number of discs may be placed on spindle 314 to form fiber catcher 300. If assembled in this manner, any suitable mechanism may be used to secure discs 316 to spindle 314 to form an exemplary fiber catcher 300. One technique is to include, near a top and bottom on spindle 314, pin receptacles 315 (e.g., 315a and 315b) or the like that can receive pins 323 (e.g., top pin 323a and bottom pin 323b) as shown in FIG. 13. Further, discs 316 that are to be placed near the top and bottom of spindle 314 may include sleeves or slots 325 that are designed to have pins 323 pass through. As shown in FIG. 11b, for example, slot 325b runs through the underside of ring 318a of disc 316b, and, as shown in FIG. 13, slot 325a runs through the topside of disc 316c. With these structures, discs 316 can be secured to spindle 314 by placing disc 316 on spindle 314 and aligning slot 325 with pin receptacle 315 and then inserting pin 323 through spindle 314 as implied in FIG. 13. With a single disc 316 secured in this way to spindle 314, additional discs 316 may be added onto spindle 314 to form fiber catcher 300.

In addition, rings 318 may include interlocking counterpart structures 320 (e.g., 320a-320d in FIG. 9 and 320e-320f in FIG. 11a) such that when stacked on spindle 314, rings 318 are fixed in position relative to adjacent rings 318, which allows arms 306 to be placed in any desired predetermined configuration with respect to arms 306 on adjacent rings 318. In other words, arms 306 can be arranged to have arms above or below on adjacent discs be stacked, staggered, or in any pattern or arrangement. It will be further noted that in addition, if interlocked discs 316 are interlocked with at least one disc 316 that is secured to spindle 314 in such a manner that the secured disc 316 is locked such that it cannot move radially on spindle 314, then all assembled discs 316 will be locked with respect to their radial orientations. In this way, a fiber catcher 300 may be assembled so that arms 306 remain in any desired pattern.

Further, a generally spherical shape for fiber catcher 300 may be achieved by placing discs 316 with relatively short arms 306 (e.g., arms 306a-306c on disc 316b in FIG. 11a) near a top and a bottom of spindle 314 (as in FIG. 13 with disc 316b and 316c) and placing discs 316 with progressively relatively longer arms toward a middle section of spindle 314, with the longest arms 306 (e.g., arms 306d-306f on disc 316a in FIG. 9) in the middle. It will be apparent that a wide variety of other shapes may be formed in a similar manner and that fiber catchers of the present invention may be constructed via a wide variety of suitable techniques.

Arms 306 may preferably range from about 4 to about 30 cm in length, depending on the overall size and desired shape of fiber catcher 300 and the relative positions of each arm 306 on spindle 314. Arms 306 may be made from any material suitable for an intended use of fiber catcher 300, such as in residential and/or commercial washers and dryers, including plastics and rubbers, and preferably thermoplastic elastomers, such as TPE-O, TPE-U, and TPE-V, as well as polypropylene, silicones, and metals. In applications in which more resiliency is desirable, thermoplastic elastomers may be selected. In applications in which more rigidity or durability is desirable, polypropylene or metals may be selected. In order to maintain a default shape of fiber catcher 300 (such as a sphere) while enabling easy access to teeth 308 and spindle 314 for cleaning and avoiding damage during intended uses, arms 306 will be made of a material that has an appropriate balance of resilience and elasticity. In a preferred embodiment, arms 306 are made of a material with an elasticity of from about 200% to about 1200%, or in another preferred embodiment from about 400% to about 1000%, or in still another preferred embodiment from about 500% to about 700%.

Spindle 314 may have any desired length for an intended use and in a preferred embodiment may be from about 7 cm to about 30 cm in length and have a radius of about 1 to about 5 cm. Spindle 314 may be made from any material suitable for an intended use of fiber catcher 300, such as in residential and/or commercial washers and dryers, including plastics and rubbers, and preferably thermoplastic elastomers, such as TPE-O, TPE-U, TPE-V, as well as polypropylene, silicones, and metals. In applications in which more resiliency is desirable, thermoplastic elastomers may be selected. In applications in which more rigidity or durability is desirable, polypropylene or metals may be selected.

Arms 306 include teeth 308 that extend away from arm 306 and are sized, spaced and angled to catch and collect fibers that are suspended in liquid or gas that passes through fiber catcher 300. Teeth 308 may be of any suitable length for a given intended purpose, and as such may be in the nanoscale range or, in a preferred embodiment, from about 0.1 cm to about 0.5 cm in length. Preferably, teeth 308 will have a width and a length that are substantially less than the width and the length of an arm 306 that teeth 308 are located on. Teeth 308 may be made from any material suitable for an intended use of fiber catcher 300, such as in residential and/or commercial washers and dryers, including plastics and rubbers, and preferably thermoplastic elastomers, such as TPE-O, TPE-U, and TPE-V, as well as polypropylene, silicones, and metals. In applications in which more resiliency is desirable, thermoplastic elastomers may be selected. In applications in which more rigidity or durability is desirable, polypropylene or metals may be selected.

Figure 11A:
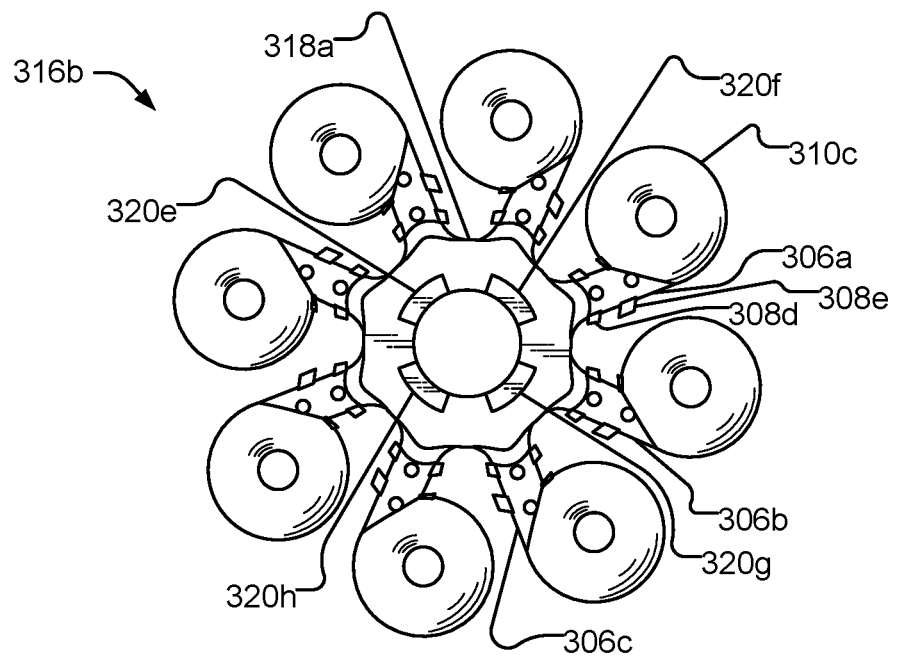
FIG. 11a is a top view of a part of the embodiment of FIG. 5.
Figure 11B:
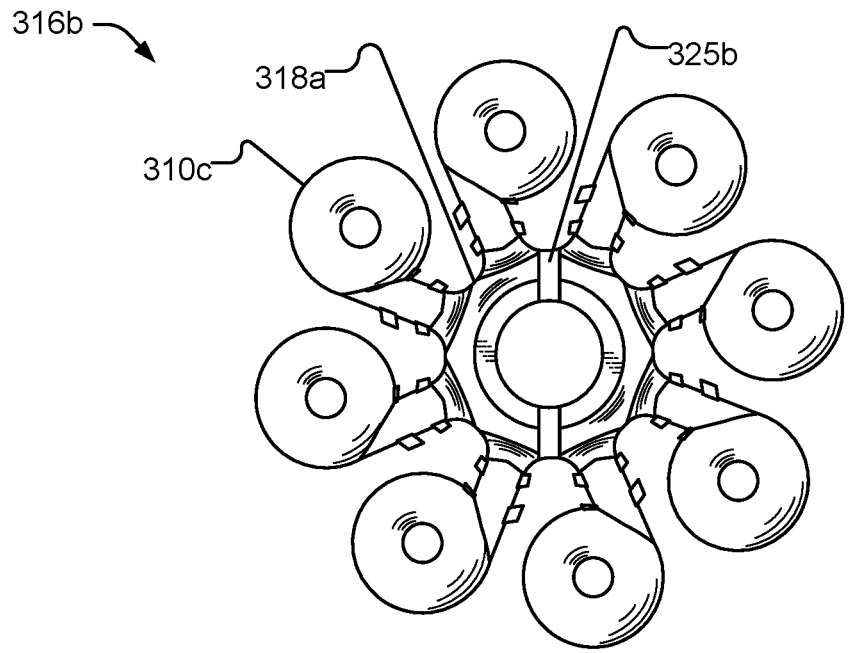
FIG. 11b is a bottom view of a part of the embodiment of FIG. 5.

In a preferred embodiment, an outer end of each arm 306 includes a protuberance 310 (e.g., 310a and 310c in FIGS. 5-6; 310c in FIG. 11a). Protuberances 310 are sized and configured such that collectively, when positioned on the outer end of each arm 306, fluids (liquids or gases) along with suspended fibers are generally able to pass to the interior portions of fiber catcher 300 while bulkier items, such as articles of clothing, are generally prevented from passing to the interior portions of fiber catcher 300. In this way, for uses involving interaction of fiber catcher 300 with clothing or similar articles such as would occur during a wash cycle in a laundry machine, for example, articles of clothing and other bulk items can be kept from interacting with, getting entangled in, and potentially being damaged by arms 306 and/or teeth 308. In a preferred embodiment, protuberances 310 may be donut or ring shaped (as shown in FIGS. 5-7), for example, with the open portion being in the same plane as disc 316 on which protuberance 310 resides. However, the open portion or aspect of protuberances 310 may be oriented differently so long as fluid and suspended fibers can pass through while bulkier items tend to be deflected. In addition, other shapes and configurations, with or without open portions, may be suitable for protuberances 310, such as cubes, shields, semi-circles, hexagonal rings, etc. In general, protuberances 310 will preferably be sized such that at least one dimension of protuberances 310 will be greater than a width and/or height of an arm 306 to which it is connected and positioned such that that dimension extends beyond arm 306 along that dimension. Protuberances 310 may be made from any material suitable for an intended use of fiber catcher 300, such as in residential and/or commercial washers and dryers, including plastics and rubbers, and preferably thermoplastic elastomers, such as TPE-O, TPE-U, and TPE-V, as well as polypropylene, silicones, and metals. In applications in which more resiliency is desirable, thermoplastic elastomers may be selected. In applications in which more rigidity or durability is desirable, polypropylene or metals may be selected.

In an exemplary embodiment, turning again to the exemplary use in a washing machine, fiber catcher 300 may be buoyant. Buoyancy serves to place or allow fiber catcher 300 to make its way to the surface of the water source, e.g., to the top of the wash, even if it starts at the bottom. Preferably, fiber catcher 300 is not so buoyant so that fiber catcher 300 sits too high out of the water; rather, in a preferred embodiment fiber catcher 300 displaces about half its weight of water. Fiber catcher 300 preferably is buoyant enough to stay on the top of the laundry, about half in and half out of the water. In this position, fiber catcher 300 is configured to pick up those fibers that tend to rest at the surface of the wash water thanks to the presence of soap. A washing machine's action of the agitation of water, coupled with surfactants in laundry soap, removes the dirt and hair from our clothes. Because soap has fats, it floats and concentrates the largest amounts of fibers at the top of the wash.

In another exemplary embodiment, fiber catcher 300 is configured to rest below the water surface or near an exit water flow. For example, some washing machines do not include a central agitator and do not use an amount of water that would allow fiber catcher 300 to move around the surface. In these situations, fiber catcher 300 can be weighted or designed to have a flat-bottom so that fiber catcher 300 rests at the bottom of the machine and moves with the action of the drum.

Exemplary embodiments like fiber catcher 300 can be used in other environments besides the washing machine example discussed above. For example, wastewater treatment plants do not have the ability to effectively filter out microfibers and thus once household effluent is treated, the fibers are being flushed out into waterways, lakes, rivers, oceans. As the outflow of a wastewater treatment plant is generally linear (as opposed to agitated as in a washing machine), there is an opportunity to configure fiber catcher 300 within an effluent pipe to ensure continual interaction with fiber catcher 300 and to allow for cleaning of fiber catcher 300 with a cleaning device. In an exemplary embodiment, fiber catcher 300 can be situated so that at any one moment about half of fiber catcher 300 extends inside an effluent pipe and the other half would be outside the effluent pipe (with the junction sealed to prevent water egress). In this embodiment, outside of the pipe there can be a comb-like self-cleaning device cleaning half of fiber catcher 300 as the other half is in the water flow, where fiber catcher 300 rotates under the influence of water flow.

In another exemplary embodiment, fiber catcher 300 could be deployed by being attached to buoy lines in harbors and rivers or strategically placed on stationary moorings.

In another exemplary embodiment, fiber catcher 300 may be used in residential and commercial clothes dryers in order to collect fibers so that such fibers do not end up clinging to clothing.

Various embodiments of the present invention can include methods, systems and devices for removing fibers from fluids and configured to withstand conditions in residential laundry machines and clothes dryers, which may include a center portion, a plurality of arms having an inner end connected to the center portion and an outer end extending away from the center portion, wherein each of the plurality of arms has a plurality of fingers extending therefrom. The plurality of fingers are sized and configured to collect fibers from fluid. A plurality of protuberances may also be included, each attached to and extending away from the outer end of each of the plurality arms, wherein the plurality of protuberances are configured to allow fluid to pass to the arms while discouraging bulk items from passing in toward the plurality of arms.

In some embodiments, each of the protuberances is ring-shaped.

In some embodiments, the center portion is a cylindrical rod with an upper end and a lower end, and the plurality of arms are distributed on a plurality of discs coupled to the cylindrical rod such that the arms on each of the plurality of discs are in a plane extending orthogonally from the cylindrical rod.

In some embodiments, the arms on each of the plurality of discs are staggered with respect to the arms on an adjacent disc on the rod such that individual ones of the plurality of arms are not directly aligned with any of the other ones of the plurality of arms of an adjacent disc.

In some embodiments, the plurality of discs are stacked on the rod such that the plurality of arms form a spiral pattern.

In some embodiments, the discs include an inner ring that fits on the rod.

In some embodiments, the plurality of arms have an elasticity of between about 200% and about 1200%.

In some embodiments, the plurality of arms have an elasticity of between about 400% and about 1000%.

In some embodiments, the plurality of arms have an elasticity of between about 500% and about 700%.

In some embodiments, a device of the present invention has a generally spherical shape.

In some embodiments, a device of the present invention has a cube shape.

In some embodiments, the plurality of arms are made of a thermoplastic elastomer material.

In some embodiments, a device for removing fibers from fluids is disclosed that includes a plurality of arms each having an inward facing end and an outward facing end, each of the plurality of arms being structurally connected via each respective inward facing end, a plurality of teeth extending from each of the plurality of arms, each of the plurality of teeth configured to collect fibers, and a plurality of protuberances each attached to the outward facing end of each of the plurality of arms and configured to allow fluids to pass inwardly while blocking bulkier items.

In some embodiments, a device as above is provided wherein the device is configured to withstand operating conditions found in residential laundry machines.

In some embodiments, a device as above is provided wherein the device is configured to withstand operating conditions found in residential clothes drying machines.

In some embodiments, a device as above is provided wherein each of the plurality of arms has a width, a height, and a length, wherein the length is along a direction between the inward facing end and the outward facing end and wherein the plurality of teeth have a width and a length that are substantially less than the width and the length of each of the plurality of arms.

In some embodiments, a device as above is provided wherein the plurality of protuberances each have at least one dimension that is larger than the width and the height of the respective arm to which the respective protuberance is attached.

In some embodiments, a device for removing fibers from an aqueous solution is provided having a central rod with a top end, a middle portion, and a bottom end. A plurality of discs are further included, each including a central opening sized and shaped to fit on the central rod and having a plurality of arms, wherein each of the plurality of arms extends outwardly from the central opening to an outer end on a plane that is substantially orthogonal with respect to the central rod, wherein the plurality of arms on a given disc of the plurality of discs has a length that is a function of the position of the given disc on the central rod such that the plurality of arms on ones of the plurality of discs coupled to the central rod proximate the top end and proximate the bottom end have a length that is shorter than the plurality of arms on ones of the plurality of discs coupled to the central rod on the middle portion. Each of the plurality of arms has a plurality of teeth extending therefrom and a protuberance attached at the outer end.

Exemplary embodiments have been disclosed above and illustrated in the accompanying drawings. Unless otherwise specified or apparent, any relative terms used herein mean within standard manufacturing tolerances or to a reasonable degree in the context in which they are used. It will be understood by those skilled in the art that various changes, omissions and additions may be made to that which is specifically disclosed herein without departing from the spirit and scope of the present invention.

What is claimed is:

1. A device for removing fibers from an aqueous solution, comprising:
    a central rod with a top end, a middle portion, and a bottom end;
    a plurality of discs each including a central opening sized and shaped to fit on the central rod and having a plurality of arms,
        wherein each of the plurality of arms extends outwardly from the central opening to an outer end on a plane that is substantially orthogonal with respect to the central rod,
        wherein the plurality of arms on a given disc of the plurality of discs has a length that is a function of the position of the given disc on the central rod such that the plurality of arms on ones of the plurality of discs coupled to the central rod proximate the top end and proximate the bottom end have a length that is shorter than the plurality of arms on ones of the plurality of discs coupled to the central rod on the middle portion, and
        wherein each of the plurality of arms has a plurality of teeth extending therefrom and a protuberance attached at the outer end.

* * * * *